(12) United States Patent
Lee et al.

(10) Patent No.: US 11,065,939 B2
(45) Date of Patent: Jul. 20, 2021

(54) MOTOR-DRIVEN AIR VENT DEVICE FOR VEHICLE

(71) Applicants: Hyundai Motor Company, Seoul (KR); Kia Motors Corporation, Seoul (KR); NIFCO KOREA Inc., Chungcheongnam-Do (KR); Hyundai Mobis Co., Ltd., Seoul (KR)

(72) Inventors: Young Ju Lee, Gyeonggi-do (KR); Pill Yoon Kim, Gyeonggi-do (KR); Byung Gyu Choi, Seoul (KR); Young Rok Lee, Gyeonggi-do (KR); Choong Yeul Kim, Gyeonggi-do (KR); Seung Hyeok Chang, Gyeonggi-do (KR); Jae Seob Choi, Gyeonggi-do (KR); Kwan Woo Lee, Gyeonggi-do (KR); Won Sik Kim, Gyeonggi-do (KR); Ji Hun Lee, Chungcheongnam-do (KR)

(73) Assignees: Hyundai Motor Company, Seoul (KR); Kia Motors Corporation, Seoul (KR); NIFCO KOREA Inc., Asan (KR); Hyundai Mobis Co., Ltd., Seoul (KR)

( * ) Notice: Subject to any disclaimer, the term of this patent is extended or adjusted under 35 U.S.C. 154(b) by 444 days.

(21) Appl. No.: 16/179,957

(22) Filed: Nov. 4, 2018

(65) Prior Publication Data
US 2019/0351744 A1   Nov. 21, 2019

(30) Foreign Application Priority Data

May 16, 2018   (KR) ........................ 10-2018-0055884

(51) Int. Cl.
*B60H 1/34* (2006.01)
*F24F 11/89* (2018.01)

(52) U.S. Cl.
CPC ............ *B60H 1/3421* (2013.01); *F24F 11/89* (2018.01); *B60H 2001/3471* (2013.01)

(58) Field of Classification Search
CPC ............ B60H 1/342; B60H 2001/3471; B60H 1/3414; F24F 11/89; F24F 13/15;
(Continued)

(56) References Cited

U.S. PATENT DOCUMENTS 2,158,413 A * 5/1939 Feinberg ............... F24F 13/075
454/315
4,375,183 A * 3/1983 Lynch ..................... F24F 13/15
137/601.09
(Continued)

FOREIGN PATENT DOCUMENTS

KR        102019005167   * 11/2017   ............ F24F 13/14

*Primary Examiner* — Edelmira Bosques
*Assistant Examiner* — Frances F. Hamilton
(74) *Attorney, Agent, or Firm* — Mintz Levin Cohn Ferris Glovsky and Popeo, P.C.; Peter F. Corless

(57) ABSTRACT

A motor-driven air vent device for a vehicle is provided. The motor-driven air vent device connects a horizontal wing of an air vent to an output shaft of a driving motor through a link structure and rotatably operates the driving motor in the forward direction or the reverse direction by a touch type switch operation. Accordingly, the vertical angular rotation operation for the horizontal wing is automatically performed by the operation of the link structure delivering the torque of the driving motor.

11 Claims, 5 Drawing Sheets

(58) Field of Classification Search
CPC ........... F24F 2013/1473; F24F 13/1426; F24F 13/08; F24F 13/14; F24F 11/79
USPC ........................................................ 454/155
See application file for complete search history.

(56) References Cited

U.S. PATENT DOCUMENTS

| | | | | |
|---|---|---|---|---|
| 4,676,146 A * | 6/1987 | Takahashi | ............... | F24F 13/15 454/153 |
| 5,080,002 A * | 1/1992 | Soethout | ............ | B60H 1/00871 454/154 |
| 5,230,654 A * | 7/1993 | Bloomer | ................ | B60H 1/345 454/155 |
| 5,234,373 A * | 8/1993 | Yamazaki | .............. | F24F 1/0011 454/319 |
| 5,364,303 A * | 11/1994 | Terry | ..................... | B60H 1/345 454/155 |
| 5,388,426 A * | 2/1995 | Wada | ................... | F24F 1/0007 62/263 |
| 5,441,451 A * | 8/1995 | Jeung | ................. | F24F 13/1413 454/313 |
| 5,470,276 A * | 11/1995 | Burnell | ................. | B60H 1/345 454/155 |
| 5,690,550 A * | 11/1997 | Mikowski | .............. | B60H 1/345 454/155 |
| 5,888,133 A * | 3/1999 | Mori | ...................... | F24F 1/0011 454/318 |
| 6,131,336 A * | 10/2000 | Krause | ................ | B60H 1/3414 49/74.1 |
| 7,575,510 B2 * | 8/2009 | Kim | ..................... | B60H 1/3428 454/155 |
| 7,997,964 B2 * | 8/2011 | Gehring | ................ | B60H 1/345 454/155 |
| 9,803,885 B2 * | 10/2017 | Komai | ................... | F24F 1/0011 |
| 9,878,596 B2 * | 1/2018 | Ross | ..................... | B60H 1/345 |
| 9,914,351 B2 * | 3/2018 | Kim | ..................... | B60K 11/085 |
| 9,989,275 B2 * | 6/2018 | Oe | ....................... | B60H 1/3421 |
| 10,076,947 B2 * | 9/2018 | Lee | ..................... | B60H 1/3414 |
| 10,239,385 B2 * | 3/2019 | Shibata | ................. | B60H 1/345 |
| 10,668,787 B2 * | 6/2020 | Lee | ....................... | B60H 1/3421 |
| 10,752,088 B2 * | 8/2020 | Stoia | ................. | B60H 1/00985 |
| 10,792,982 B2 * | 10/2020 | Lee | ......................... | B60H 1/247 |
| 2003/0050001 A1 * | 3/2003 | Kamio | ................... | B60H 1/345 454/155 |
| 2005/0042982 A1 * | 2/2005 | Okada | ................... | B60H 1/345 454/284 |
| 2005/0239391 A1 * | 10/2005 | Shibata | ................ | B60H 1/3421 454/155 |
| 2006/0052046 A1 * | 3/2006 | Krause | ................ | B60H 1/3421 454/155 |
| 2009/0181611 A1 * | 7/2009 | Hollender | ................ | F24F 11/30 454/333 |
| 2011/0155365 A1 * | 6/2011 | Wiese | ..................... | F24F 7/013 165/244 |
| 2013/0149952 A1 * | 6/2013 | Demerath | ............ | B60H 1/3421 454/155 |
| 2014/0273807 A1 * | 9/2014 | Frayer, III | ........... | B60K 11/085 454/335 |
| 2015/0174989 A1 * | 6/2015 | Oe | ......................... | F24F 13/14 454/152 |
| 2016/0153679 A1 * | 6/2016 | Komai | ................... | F24F 1/0011 454/324 |
| 2016/0313025 A1 * | 10/2016 | Nemoto | ............. | F24F 13/1426 |
| 2017/0305238 A1 * | 10/2017 | Brinas | ................. | B60H 1/3421 |
| 2018/0022193 A1 * | 1/2018 | Lin | ..................... | B60H 1/3421 454/155 |
| 2018/0037090 A1 * | 2/2018 | Mikolajewski | ...... | B60H 1/3421 |
| 2018/0304726 A1 * | 10/2018 | Araujo Nieto | ....... | B60H 1/3421 |

* cited by examiner

MOTOR-DRIVEN AIR VENT DEVICE FOR VEHICLE

CROSS-REFERENCE TO RELATED APPLICATION

This application claims under 35 U.S.C. § 119(a) the benefit of priority to Korean Patent Application No. 10-2018-0055884 filed on May 16, 2018, the entire contents of which are incorporated herein by reference.

BACKGROUND

(a) Technical Field

The present disclosure relates to a motor-driven air vent device for a vehicle, and more particularly, to a motor-driven air vent device for a vehicle, which improves a vertical angular rotation operation of a horizontal wing for adjusting the vertical airflow of air discharged into the interior thereof to a motor-driven system.

(b) Background Art

Generally, an air vent for discharging the air into the interior thereof by the operation of an air conditioner for a vehicle includes a center air vent mounted on a center fascia panel between the fronts of a driver seat and a passenger seat, and a side vent mounted on a crash pad of the fronts of the driver seat and the passenger seat. A conventional air vent includes at least five or six horizontal wings and vertical wings, respectively and is produced to have a large vertical height, such that the direction of the air discharged into the interior thereof is adjusted toward the passenger's body (bottom: navel, top: face). However, the size of the air vent becomes substantially large, which affects a package problem with peripheral components and design constraints.

In addition, since the conventional air vent requires a driver to directly perform an angular rotation vertically for a horizontal wing through a knob to adjust the vertical airflow, the driver is temporarily unable to look ahead while driving the vehicle thus decreasing driving safety. Further, since a plurality of horizontal wings and vertical wings in the conventional air vent are exposed in appearance, a center fascia panel or a crash pad occupies a wide mounting space, thereby eventually reducing the degree of freedom of design for a cluster, an audio video navigation (AVN) device, etc. located near the air vent. Accordingly, the mounting location of the air vent is moving toward the lower area of the center fascia panel due to the enlargement of the cluster and the AVN device mounted in the interior of the vehicle, and particularly, a slim type air vent is applied that has a low vertical height and a long horizontal length in an exterior design of the air vent.

The slim type air vent has a longer horizontal length and a lower vertical height than the conventional air vent, such that it does not occupy a large installation area and improves the degree of freedom of design for peripheral components (a cluster, an AVN device, etc.). However, there is a disadvantage in that it is not possible to conveniently adjust the vertical adjustment of the air discharged into the interior thereof.

In other words, in the slim type air vent, only a single horizontal wing is exposed to the outside at the outlet of an air duct, such that it is inconvenient for the driver to grasp and operate the single horizontal wing directly by hand to adjust the vertical airflow adjustment. Similarly, when the driver directly operates the vertical airflow adjustment during driving, the driver is temporarily unable to look ahead while driving the vehicle which thus decreases driving safety.

The above information disclosed in this section is merely for enhancement of understanding of the background of the disclosure and accordingly it can contain information that does not form the prior art that is already known in this country to a person of ordinary skill in the art.

SUMMARY

The present disclosure provides a motor-driven air vent device for a vehicle, which may connect a horizontal wing of an air vent with an output shaft of a driving motor through a link structure, and rotatably drive a driving motor in the forward direction or the reverse direction by a touch type switch operation, thus automatically performing a vertical angular rotation operation of the horizontal wing by operating the link structure delivering the torque of the driving motor.

Accordingly, the present disclosure provides a motor-driven air vent device for a vehicle including a horizontal wing module provided as a structure having at least one horizontal wing vertically performing an angular rotation, and mounted on an air discharge port of an air duct; a motor mounted on an outside surface of the air duct; a control module configured to apply a drive signal to the motor; a first link connected to an output shaft of the motor to perform the vertical angular rotation; and a second link having a front end portion hinge-connected to the horizontal wing module, a rear end portion hinge-connected to the first link, and a middle portion between the front end thereof and the rear end thereof hinge-connected to the outside surface of the air duct to interlock upon angular rotation operation of the first link to perform the vertical angular rotation for the horizontal wing of the horizontal wing module.

The middle portion of the second link may be formed with a long aperture extended forwards and backwards, and the outside surface of the air duct may be formed with a guide pin inserted into the long aperture. The length of the long aperture may be set as a length that compensates a longitudinal location variation of the second link upon vertical angular rotation operation of the second link. In addition, a stepped portion that corresponds to the thickness of the motor and the first link may be interposed between the front end portion and the rear end portion of the second link.

The horizontal wing module in accordance with an exemplary embodiment of the present disclosure includes a spacer provided as a structure that has a plurality of wing connectors formed to be protruded on a front end portion thereof, has a slot formed on upper and lower locations of a rear end portion thereof, and has a guide aperture formed on a vertical middle location thereof, and mounted on one side portion of the air duct; a single horizontal wing having a front end portion of one side hinge-connected to an inside surface of a central wing connector of the plurality of wing connectors, and a rear end portion of one side hinge-connected to the front end portion of the second link through the guide aperture; an upper horizontal wing and a lower horizontal wing located above and below the single horizontal wing to be spaced apart from each other, and having a front end portion of one side hinge-connected to the upper and lower wing connectors of the plurality of wing connectors, respectively; and a guide link having an upper end portion and a lower end portion hinge-connected to the rear end portions of one sides of the upper horizontal wing and the lower horizontal wing, respectively, and having a vertical middle portion hinge-connected to the rear end portion of one side of the single horizontal wing.

Further, one side surface of the single horizontal wing may be formed integrally with a hinge fastening rod hinge-fastened to the front end portion of the second link through the guide aperture of the spacer. The rear end portions of one sides of the upper horizontal wing and the lower horizontal wing in addition to the rear end portion of one side of the single horizontal wing may be formed with a hinge fastening extension end for hinge-fastening with the guide link to be extended backwards.

In addition, the horizontal wing module may further include an upper auxiliary wing having a hinge end, which is hinge-connected to the rear end portion of the upper horizontal wing, formed on a front end portion thereof, and having a pin, which is fastened to be transferable to an upper slot of the spacer, formed on a rear end portion thereof; and a lower auxiliary wing having a hinge end, which is hinge-connected to the rear end portion of the lower horizontal wing, formed on a front end portion thereof, and having a pin, which is fastened to be transferable to a lower slot of the spacer, formed on a rear end portion thereof. The upper horizontal wing and the lower horizontal wing may be covered by a garnish mounted on a crash pad or an air duct to expose only the single horizontal wing to the interior thereof.

The control module in accordance with an exemplary embodiment of the present disclosure may include an airflow adjustment switch module mounted on a crash pad or a steering wheel of the front of a driver seat; and a controller configured to receive an operation signal of the airflow adjustment switch module to apply a forward or a reverse drive signal to a motor. The airflow adjustment switch module may include an upward touch switch, a downward touch switch, and an auto-operational touch switch in a predetermined arrangement; and is adopted as a touch sensor module on which a touch sensor is located on the bottom of each touch switch.

The present disclosure provides the following effects through the above configuration.

First, it may be possible to perform the angular rotation for the horizontal wing of the air vent upwards and downwards by the motor and the link structure only by the touch switch operation of the driver, thus conveniently adjusting automatically the vertical adjustment of the air discharged into the interior thereof in the desired direction.

Second, it may be possible to repeatedly perform the angular rotation for the horizontal wing of the air vent upwards and downwards, thus uniformly discharging the air throughout the entire interior thereof.

Third, it may be possible to achieve the driving safety since the driver touches only the touch switch while looking ahead while the vehicle is being driven.

Fourth, it may be possible to automatically operate the vertical angular rotation for the horizontal wing, outside of the manual operation that the driver operates the horizontal wing included in the conventional general air vent or in the slim type air vent directly by hand, thus improving the convenience of the vehicle and contributing to the upgrading thereof.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
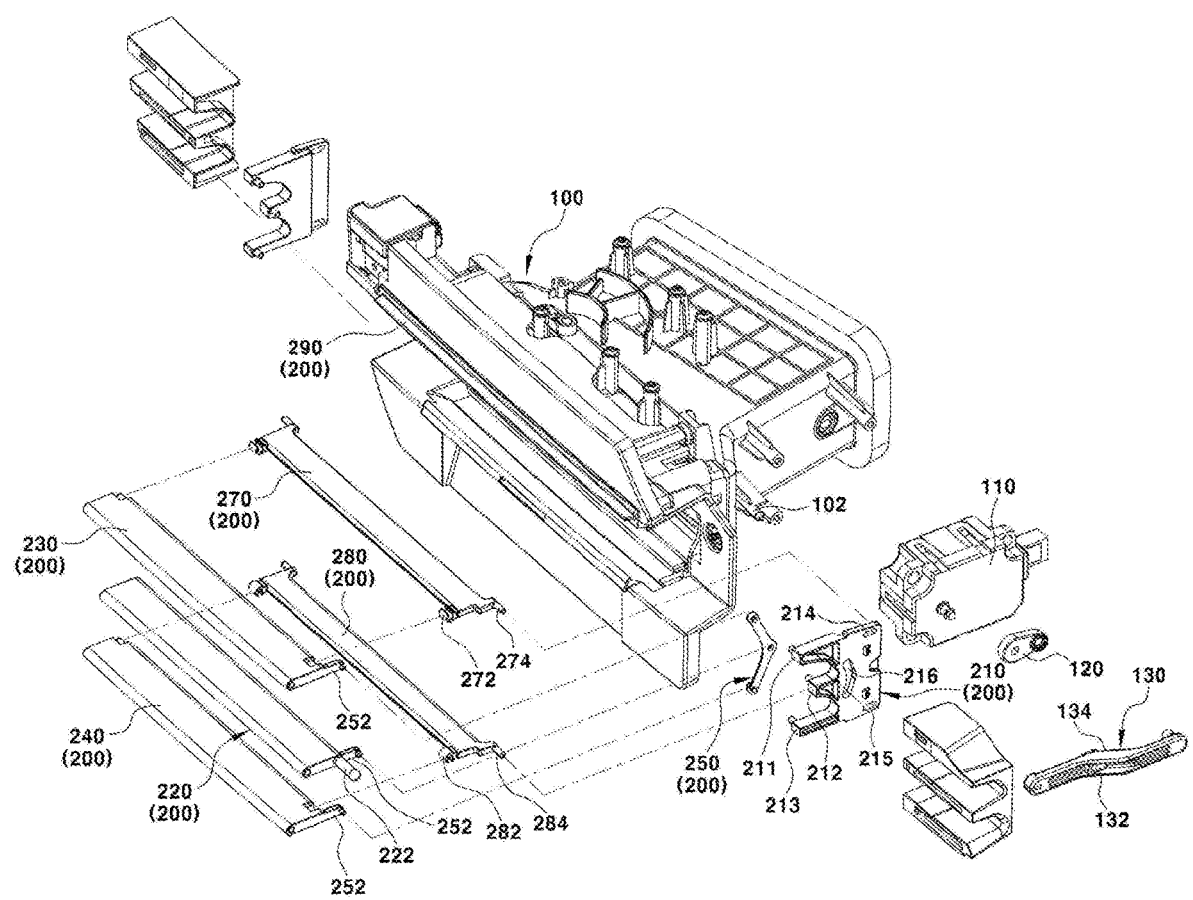
FIG. 1 is a detailed diagram of a motor-driven air vent device for a vehicle in accordance with an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Among the direction terms used in the present disclosure, the front end portion, the front, etc. refer to the interior direction (the driver seat and the front passenger seat side) of the vehicle based on the air duct, and the rear end, the rear, etc. refer to the exterior direction (the engine room side) of the vehicle.

Figure 2:
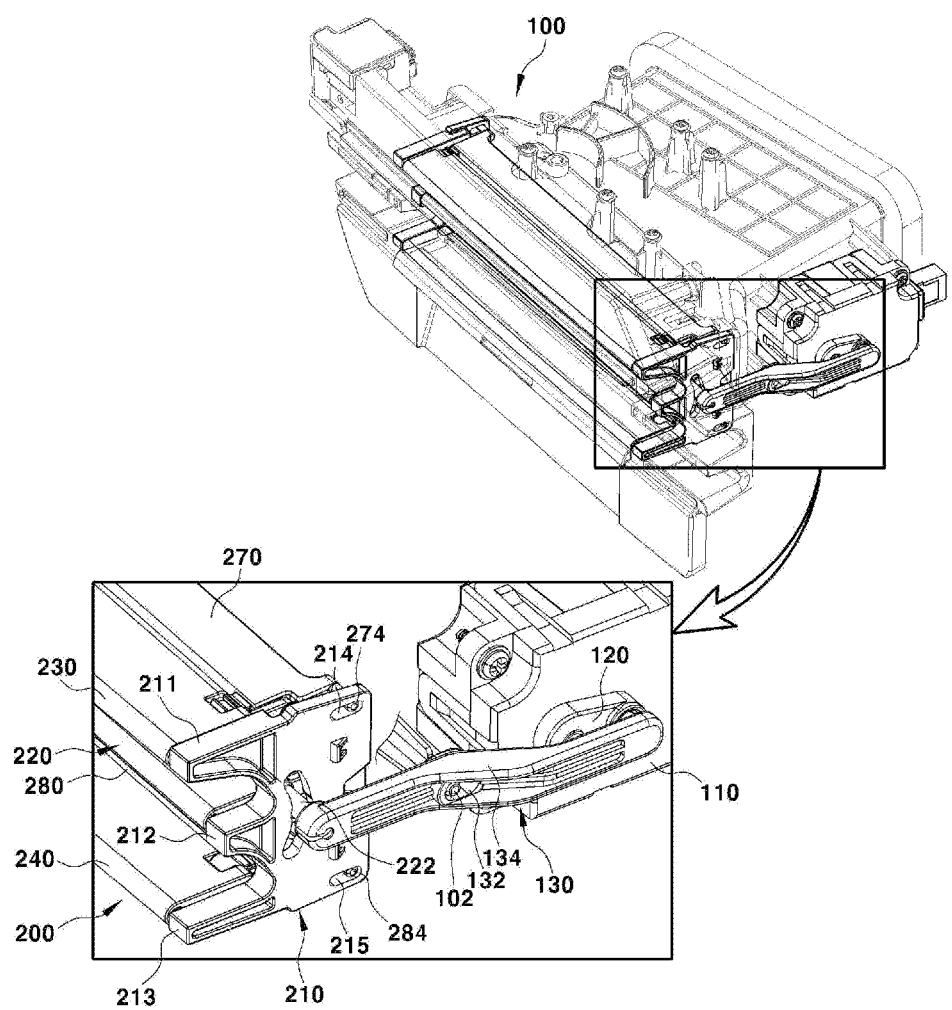
FIG. 2 is a perspective diagram illustrating an assembled state of the motor-driven air vent device for the vehicle in accordance with an exemplary embodiment of the present disclosure.

FIG. 1 is a detailed diagram of a motor-driven air vent device for a vehicle in accordance with the present disclosure, and FIG. 2 is an assembled perspective diagram illustrating an assembled state thereof. In FIGS. 1 and 2, a reference numeral 100 refers to an air duct.

A horizontal wing module 200 having at least one horizontal wing for performing a vertical angular rotation may be mounted on an air discharge port that is an outlet of the air duct 100. When the horizontal wing module 200 includes one or more horizontal wings mounted on the air discharge port of the air duct to perform the vertical angular rotation, and a link structure for concurrently performing the vertical angular rotation for each horizontal wing, any structure may be adopted as one configuration of the motor-driven air vent device of the present disclosure, and one exemplary embodiment of the horizontal wing module 200 will be described in detail below.

A motor 110 configured to perform forward and reverse rotation drive as a type of an actuator may be mounted on an outside surface of one side of the air duct 100. In addition, a first link 120 may be connected to an output shaft of the motor 110 to perform the vertical angular rotation. Accordingly, when the motor 110 rotates in the forward direction, the first link 120 performs the angular rotation at a predetermined angle upwards, and on the contrary, when the motor 110 rotates in the reverse direction, the first link 120 performs the angular rotation at a predetermined angle downwards.

According to the present disclosure, a second link 130 having a longer length than the first link 120 may be hinge-connected between the horizontal wing module 200 and the first link 120, and the second link 130 interlocks upon the vertical angular rotation operation of the first link 120 to perform a seesaw operation, and performs the vertical angular rotation for the horizontal wing of the horizontal wing module 200 for the vertical airflow adjustment. Accordingly, the front end portion of the second link 130 may be hinged-connected to a guide link 250 of the horizontal wing module 200, and the rear end portion of the second link 130 may be folded and hinge-connected to the rear end portion of the first link 120, and the longitudinal middle portion of the second link 130 may be hinge-fastened to the outside surface of the air duct 100.

Particularly, a long aperture 132 having a shape extended longitudinally forwards and backwards may be formed on the longitudinal middle portion of the second link 130 and a guide pin 102 may be formed to protrude on the outside surface of a first side of the air duct 100; and by inserting and fastening the guide pin 102 into the long aperture 132, the longitudinal middle portion of the second link 130 may be hinge-fastened to the outside surface of the air duct 100. Additionally, the long aperture 132 formed on the second link 130 may have a predetermined length that extends forwards and backwards since the longitudinal location variation of the second link 130 may occur when the second link 130 interlocks upon the vertical angular rotation of the first link 120 to perform the seesaw operation.

Figure 3:
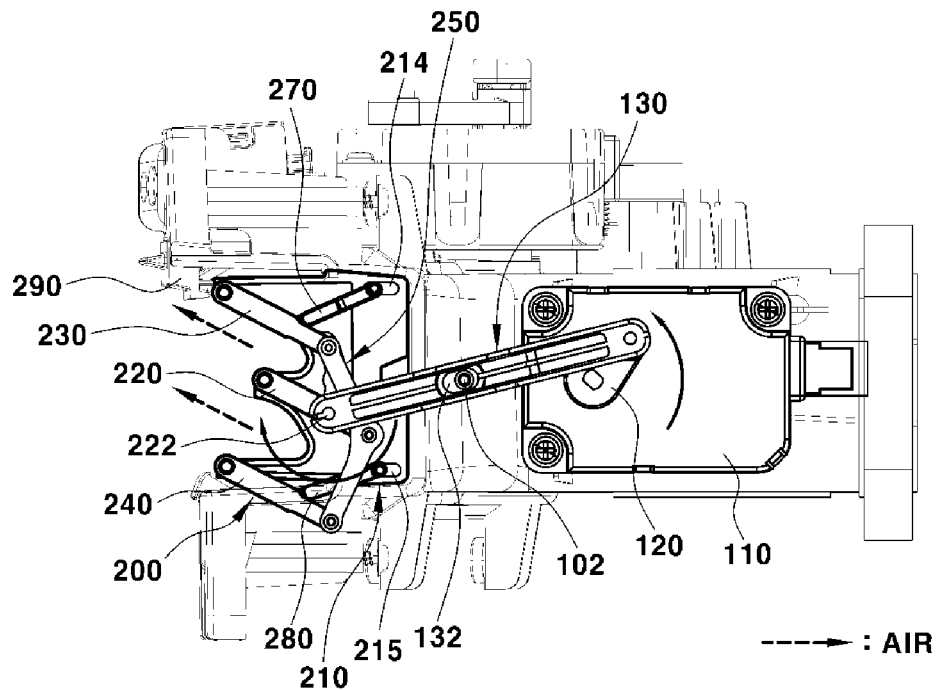
FIGS. 3 to 5 are side cross-sectional diagrams illustrating an operating state of the motor-driven air vent device for the vehicle in accordance with an exemplary embodiment of the present disclosure.

Accordingly, the length of the long aperture 132 may be, as indicated as "an operation section" in FIG. 3, set as a length that compensates a location moving distance due to the longitudinal location variation when the second link 130 interlocks with the angular rotation operation of the first link 120 to perform the vertical angular rotation operation (e.g., when performing the angular rotation as if performing the seesaw operation), and of course, the location moving distance of the front and rear of the second link may be limited by the guide pin 102 inserted in the long aperture.

Furthermore, a stepped portion 134 that corresponds to the thickness of the motor 110 and the first link 120 may be interposed between the front end portion of the second link 130 and the rear end portion thereof. In other words, the front end portion of the second link 130 may be arranged proximate to the front outside surface of the air duct 100, and the rear end portion of the second link 130 is a state where the motor 110 and the first link 120 are mounted on the rear outside surface of the air duct 100, to be arranged to be further protruded toward the outside. Accordingly, the stepped portion 134 that corresponds to the thickness of the motor 110 and the first link 120 may be interposed between the front end portion (e.g., the end portion arranged proximate to the outside surface of the air duct) of the second link 130 and the rear end portion (e.g., the end portion arranged on the surfaces of the motor and the first link) of the second link 130.

Herein, the configuration of the horizontal wing module in accordance with the exemplary embodiment of the present disclosure will be described as follows. First, a spacer 210 of one configuration of the horizontal wing module 200 may be mounted on the front portion of a first side surface of the air duct 100 (e.g., one side thereof). The spacer 210 may be provided as a plate-like structure having a plurality of wing connectors 211, 212, 213 formed to be protruded on a front end portion thereof, having slots 214, 215 formed to be penetrated at the upper and lower locations of a rear end portion thereof, respectively, and having an arc-shaped guide aperture 216 formed to be penetrated on a vertical middle location thereof.

In addition, the front end portion of a first side of a single horizontal wing 220 (e.g., one side thereof) may be hinge-connected to the inside surface of the central wing connector 212 of the plurality of wing connectors 211, 212, 213, and the single horizontal wing 220 may be arranged horizontally on the outlet of the air duct 100. For reference, as it will be described later, the single horizontal wing 220 may be referred to as a single horizontal wing since it is a horizontal wing that is independently exposed in the interior direction through the inlet of the air vent.

An upper horizontal wing 230 and a lower horizontal wing 240 for guiding an upward or downward discharge of the air may be arranged parallel to the single horizontal wing 220 at the location above and below the single horizontal wing 220 to be spaced apart from each other. The front end portions of first sides of the upper horizontal wing 230 and the lower horizontal wing 240 may be hinge-connected to the upper and lower wing connectors 211, 213 of the plurality of wing connectors 211, 212, 213, respectively.

Additionally, a hinge groove may be formed on the front end portion of one side of each of the horizontal wings 220, 230, 240 and a hinge pin may be formed on the inner surface of the wing connectors 211, 212, 213 to provide a hinge connection between the horizontal wings and the wing connectors, respectively. One guide link 250 may be hinge-connected to the upper horizontal wing 230 and the lower horizontal wing 240 in addition to the single horizontal wing 220.

In particular, the guide link 250 is a plate structure provided in a "V" shape that is open at an obtuse angle toward the front thereof when viewed from the side surface thereof, and the upper end portion thereof and the lower end portion thereof may be hinge-connected to the rear end portions of one sides of the upper horizontal wing 230 and the lower horizontal wing 240, respectively, and the middle portion thereof may be hinge-connected to the rear end portion of one side of the single horizontal wing 220.

A hinge-fastening extension end 252 for hinge-fastening with the guide link 250 may be formed to be extended backwards on the rear end portions of one sides of the upper horizontal wing 230 and the lower horizontal wing 240 in addition to the rear end portion of one side of the single horizontal wing 220. Accordingly, by inserting and fastening the hinge pin formed on the hinge-fastening extension end 252 into a fastening aperture of the guide link 250, the rear end portion of each of the horizontal wings 220, 230, 240 may be hinge-fastened to the guide link 250.

The front end portion of the second link 130 may be hinge-connected to the single horizontal wing 220 through the guide aperture 216 formed on the spacer 210. For this purpose, a hinge fastening rod 222 hinge-fastened to the front end portion of the second link 130 through the guide aperture 216 of the spacer 210 may be formed integrally on one side surface of the single horizontal wing 220. Accordingly, by inserting and penetrating the hinge fastening rod 222 of the second link 130 through the guide aperture 216 of the spacer 210 to insert and fasten the hinge fasting rod 222 into the aperture formed on the front end portion of the second link 130, an angular rotational force of the second link 130 may delivered to the guide link 250 through the hinge fastening rod 222.

The horizontal wing module 200 of the present disclosure may further include an upper auxiliary wing 270 and a lower auxiliary wing 280 for guiding the discharge direction of the air as an assistant. The front end portion of the upper auxiliary wing 270 may be hinge-connected to the rear end portion of the upper horizontal wing 230, the rear end portion thereof may be fastened to be transferable to an upper slot 214 of the spacer 210 through a pin, the front end portion of the lower auxiliary wing 280 may be hinge-connected to the rear end portion of the lower horizontal wing 240, and the rear end portion thereof may be fastened to be transferable to a lower slot 215 of the spacer 210.

More specifically, a hinge end 272 formed on the front end portion of the upper auxiliary wing 270 may be hinge-connected to the rear end portion of the upper horizontal wing 230 and at the same time, a pin 274 formed on the rear end portion thereof may be fastened to be transferable to the upper slot 214 of the spacer. Accordingly, the upper auxiliary wing 270 may be located behind the upper horizontal wing 230 to prevent the air from leaking upwards and also to guide the air toward the upper auxiliary wing 270.

Similarly, a hinge end 282 formed on the front end portion of the lower auxiliary wing 280 may be hinge-connected to the rear end portion of the lower horizontal wing 240 and at the same time, a pin 284 formed on the rear end portion thereof may be fastened to be transferable to the lower slot 215 of the spacer. Accordingly, the lower auxiliary wing 280 may be located behind the lower horizontal wing 240 to prevent the air from leaking downwards and also to guide the air toward the lower horizontal wing 240.

Figure 4:
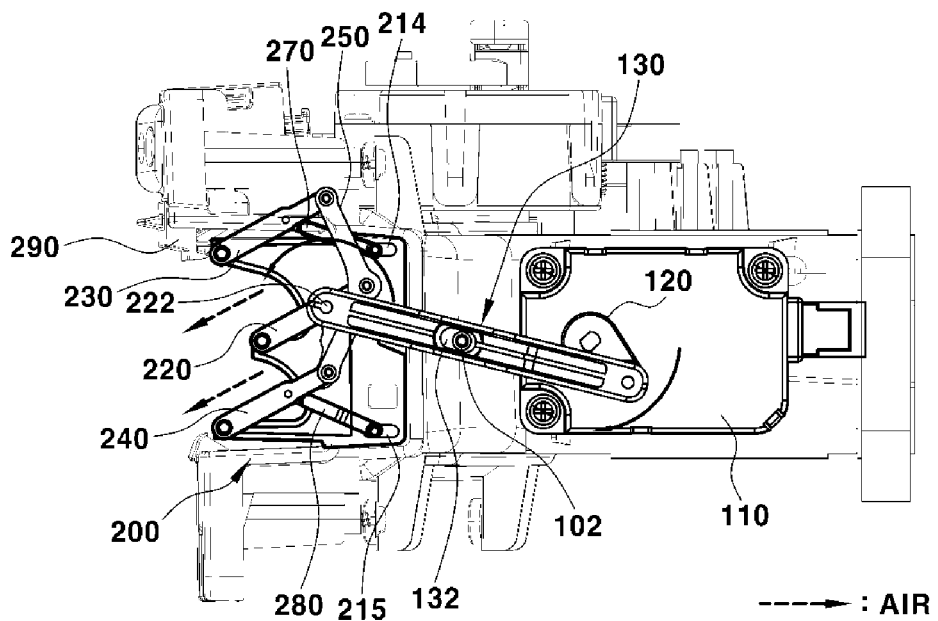
Figure 5:
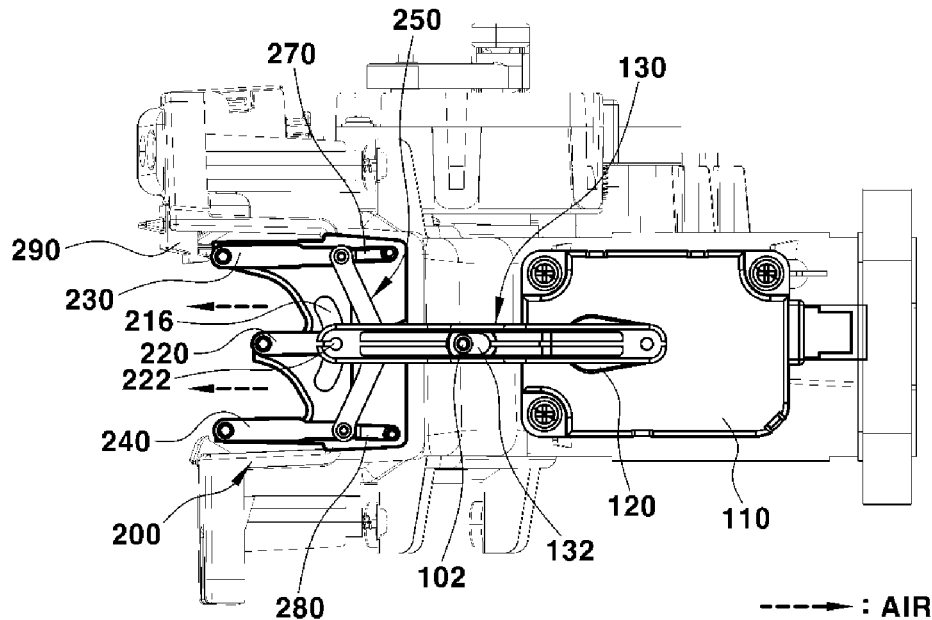

As illustrated in FIGS. 3 to 5, the upper horizontal wing 230 and the lower horizontal wing 240 of the horizontal wing module 200 composed of the above configuration may be covered by a garnish 290 mounted on a crash pad or an air duct and thereby become invisible from the interior thereof, and only the single horizontal wing 220 may be exposed to the outside (the interior thereof) to express a simplified aesthetic of the slim air vent as if there is only one horizontal wing in appearance.

Figure 6:
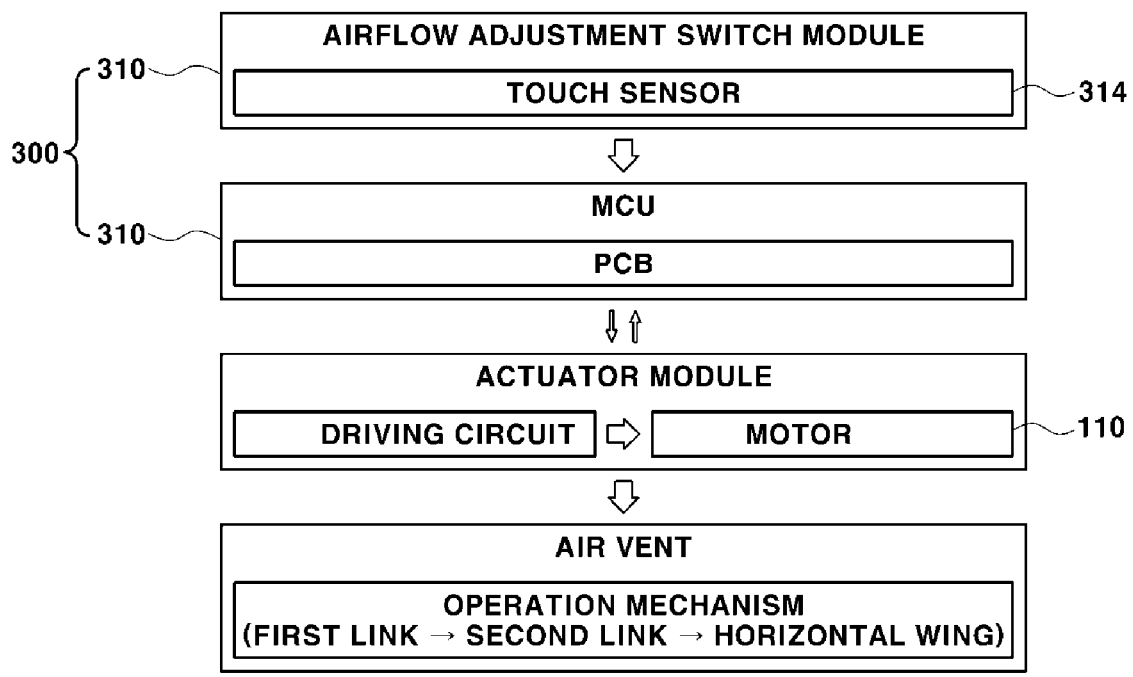
FIG. 6 is a control configuration diagram of the motor-driven air vent device for the vehicle in accordance with an exemplary embodiment of the present disclosure.
Figure 7:
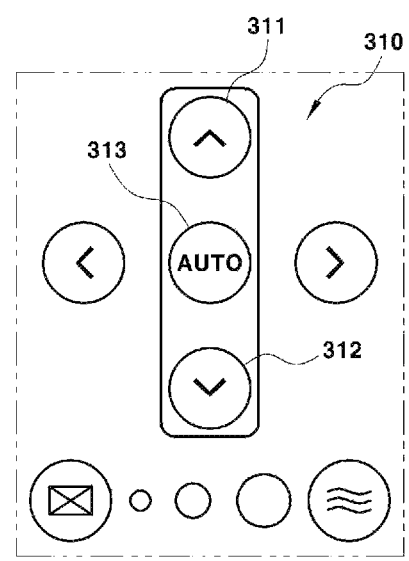
FIG. 7 is a schematic diagram illustrating a touch type airflow adjustment switch for operating the motor-driven air vent device for the vehicle in accordance with an exemplary embodiment of the present disclosure.

Moreover, the motor-driven air vent device of the present disclosure may include a control module 300 configured to apply a drive signal to the motor to allow the vertical angular rotation for the horizontal wings to be performed automatically by driving the motor. Referring to FIGS. 6 and 7, the control module 300 may include an airflow adjustment switch module 310 mounted around the driver seat, such as a crash pad or a steering wheel of the front of the driver seat, and a controller 320 configured to receive an operation signal of the airflow adjustment switch module 310 to apply a forward or reverse drive signal to the motor 110.

The airflow adjustment switch module 310 may include an upward touch switch 311, a downward touch switch 312, and an auto-operational touch switch 313 in a predetermined arrangement; may be adopted as a touch sensor module on which a touch sensor 314 mounted on the bottom of each of the touch switches 311, 312, 313 for detecting a touch is located; and may be additionally adopted as a button or rotary switch module.

Herein, an operation flow of the motor-driven air vent of the present disclosure composed of the above configuration will be described as follows.

Upward Airflow Adjustment of the Air

FIG. 3 illustrates an operating state in which the motor-driven air vent in accordance with the present disclosure guides the interior discharge direction of the air upwards.

First, when the driver touches or otherwise engages the upward touch switch 311 of the airflow adjustment switch module 310, the controller 320 may be configured to recognize a touch signal and then apply a forward drive signal to the motor 110. Then, the first link 120 may perform the angular rotation upwards based on the forward driving of the motor 110.

When the first link 120 performs the angular rotation upwards, the front end portion of the second link 130 may perform the angular rotation downwards and the rear end portion thereof may perform the angular rotation upwards like the seesaw around the middle hinge point of the second link 130, that is, the point where the guide pin 102 is inserted and fastened into the long aperture 132 of the second link 130.

As described above, when the front end portion of the second link 130 performs the angular rotation downwards, the hinge fastening rod 222 of the single horizontal wing 220 hinge-connected to the front end portion of the second link 130 may be pulled downwards along the arc-shaped trajectory of the guide aperture 216.

Since the rear end portions of the upper horizontal wing 230 and the lower horizontal wing 240 in addition to the rear end portion of the single horizontal wing 220 are simultaneously hinge-connected to the guide link 250, when the hinge fastening rod 222 formed on the rear end portion of the single horizontal wing 220 is pulled downwards, the rear end portions of the upper horizontal wing 230 and the lower horizontal wing 240 in addition to the rear end portion of the single horizontal wing 220 may perform the angular rotation downwards around the front hinge point of each of the horizontal wings 220, 230, 240 connected to the wing connectors 211, 212, 213 of the spacer 210.

Additionally, the front end portion of the upper auxiliary wing 270 and the front end portion of the lower auxiliary wing 280 may move downwards together when the rear end portions of the upper horizontal wing 230 and the lower horizontal wing 240 move downwards, and the pins 274, 284 formed on the rear end portion of the upper auxiliary wing 270 and the rear end portion of the lower auxiliary wing 280 may be transferred to the front section of the slot 215.

As described above, the rear end portions of the upper horizontal wing 230 and the lower horizontal wing 240 in addition to the rear end portion of the single horizontal wing 220 may perform the angular rotation downwards, as illustrated in FIG. 3, such that the upper horizontal wing 230 and the lower horizontal wing 240 in addition to the single horizontal wing 220 arranged in an upwardly inclined manner toward backwards and forwards when viewed from the side surface thereof.

Accordingly, the air discharged through the outlet of the air duct 100 may be guided by the upper horizontal wing 230 and the lower horizontal wing 240 in addition to the single horizontal wing 220 arranged in an upwardly inclined manner toward backwards and forwards, and thus the upward airflow adjustment more easily discharged toward the upper space of the interior thereof is implemented.

Downward Airflow Adjustment of the Air

FIG. 4 illustrates an operating state in which the motor-driven air vent in accordance with the present disclosure guides the interior discharge direction of the air downwards.

First, when the driver touches or otherwise engages the downward touch switch 312 of the airflow adjustment switch module 310, the controller 320 may be configured to detect a touch signal and apply a reverse drive signal to the motor 110. Then, the first link 120 may perform the angular rotation downwards depending upon the reverse driving of the motor 110.

When the first link 120 performs the angular rotation downwards, the front end portion of the second link 130 may perform the angular rotation upwards and the rear end portion thereof performs the angular rotation downwards like the seesaw around the hinge point of the middle portion of the second link 130, that is, the point where the guide pin 102 is inserted and fastened into the long aperture 132 of the second link 130. Accordingly, when the front end portion of the second link 130 performs the angular rotation upwards, the hinge fastening rod 222 of the single horizontal wing 220 hinge-connected to the front end portion of the second link 130 may be pulled upwards along the arc-shaped trajectory of the guide aperture 216.

Since the rear end portions of the upper horizontal wing 230 and the lower horizontal wing 240 in addition to the rear end portion of the single horizontal wing 220 may be simultaneously hinge-connected to the guide link 250, when the hinge fastening rod 222 formed on the rear end portion of the single horizontal wing 220 is pulled upwards, the rear end portions of the upper horizontal wing 230 and the lower horizontal wing 240 in addition to the rear end portion of the single horizontal wing 220 may perform the angular rotation upwards with respect to the front hinge point of each of the horizontal wings 220, 230, 240 connected to the wing connectors 211, 212, 213 of the spacer 210.

The front end portion of the upper auxiliary wing 270 and the front end portion of the lower auxiliary wing 280 may move upwards together when the rear end portions of the upper horizontal wing 230 and the lower horizontal wing 240 move upwards, and the pins 274, 284 formed on the rear end portion of the upper auxiliary wing 270 and the rear end portion of the lower auxiliary wing 280 may be transferred to the front section of the slot 215.

As described above, the rear end portions of the upper horizontal wing 230 and the lower horizontal wing 240 in addition to the rear end portion of the single horizontal wing 220 may perform the angular rotation upwards, and thus, as illustrated in FIG. 4, the upper horizontal wing 230 and the lower horizontal wing 240 in addition to the single horizontal wing 220 may be arranged in an downwardly inclined manner toward backwards and forwards when viewed from the side surface thereof.

Accordingly, the air discharged through the outlet of the air duct 100 may be guided by the upper horizontal wing 230 and the lower horizontal wing 240 in addition to the single horizontal wing 220 arranged in a downwardly inclined manner toward backwards and forwards, and thus the downward airflow adjustment more easily discharged toward the lower space of the interior thereof is implemented.

Neutral Airflow Adjustment of the Air

FIG. 5 illustrates a neutral operating state in which the motor-driven air vent in accordance with the present disclosure linearly guides the interior discharge direction of the air. For example, when the driver touches or otherwise engages the auto-operational touch switch 313 of the airflow adjustment switch module 310 within a predetermined time (e.g., with minimal contact), the controller 320 may be configured to detect a touch signal as a neutral location return signal to apply a forward or reverse drive signal to the motor 110.

Accordingly, the rotation driving of the motor 110 may be operated by restoring the horizontal wings 220, 230, 240, which have been inclined upwards or downwards, back to a neutral location (e.g., the arrangement forming the straight line backwards and forwards when viewed from the side surface thereof), and as explained in the upward and downward airflow adjustment operations, by continuously operating the first and second links 120, 130, the guide link 250, etc., as illustrated in FIG. 5, the upper and lower horizontal wings 230, 240 in addition to the single horizontal wing 220 form the straight-line arrangement along forwards and backwards, such that the airflow of the air may be adjusted to be discharged to the space between the upper space and the lower space.

Upward and Downward Airflow Repeating Adjustment of the Air

For example, when the driver softly touches the auto-operational touch switch 313 of the airflow adjustment switch module 310 for a predetermined time or greater, the controller 320 may be configured to detect a touch signal at this time as a signal that automatically repeats the upward discharge and the downward discharge of the air to alternately apply a forward drive signal and a reverse drive signal to the motor 110 at regular periods.

Accordingly, by repeating the forward and reverse rotation of the motor 110, as explained in the upward and downward airflow adjustment operations, the upper and lower horizontal wings 230, 240 in addition to the single horizontal wing 220 may be repeatedly operated upwards and downwards by the continuous operation of the first and second links 120, 130, the guide link 250, etc., such that the air may be repeatedly discharged toward the upper space and the lower space of the interior thereof, and in this case, it may be useful for evenly discharging the cooling air or the heating air over the entire interior space of the vehicle.

As described above, according to the present disclosure, it may be possible to perform the angular rotation for the horizontal wings of the air vent upwards or downwards by the motor, the first and second links, the guide link, etc. only by the touch switch operation of the driver, thus conveniently performing automatically the vertical airflow adjustment of the air discharged into the interior thereof in the desired direction.

Having described the exemplary embodiments of the present disclosure in detail with reference to the drawings, the present disclosure is not limited to the above-described exemplary embodiments, and various modifications can be made without departing from the technical scope of the present disclosure.

What is claimed is:

1. A motor-driven air vent device for a vehicle, comprising:
   a horizontal wing module having at least one horizontal wing vertically performing an angular rotation, and mounted on an air discharge port of an air duct;
   a motor mounted on an outside surface of the air duct;
   a control module configured to apply a drive signal to the motor;
   a first link connected to an output shaft of the motor to perform the vertical angular rotation; and
   a second link having a front end portion hinge-connected to the horizontal wing module, having a rear end portion hinge-connected to the first link, and having a middle portion between the front end thereof and the rear end thereof hinge-connected to the outside surface of the air duct to interlock upon angular rotation operation of the first link to perform the vertical angular rotation for the horizontal wing of the horizontal wing module.

2. The motor-driven air vent device for the vehicle of claim 1, wherein the middle portion of the second link is formed with a long aperture extended forwards and backwards, and the outside surface of the air duct is formed with a guide pin inserted into the long aperture.

3. The motor-driven air vent device for the vehicle of claim 2, wherein the length of the long aperture is set as a length that compensates a longitudinal location variation of the second link upon the vertical angular rotation operation of the second link.

4. The motor-driven air vent device for the vehicle of claim 1, wherein a stepped portion that corresponds to the thickness of the motor and the first link is interposed between the front end portion of the second link and the rear end portion thereof.

5. The motor-driven air vent device for the vehicle of claim 1, wherein the horizontal wing module includes:
   a spacer having a plurality of wing connectors formed to be protruded on a front end portion thereof, a slot formed on the upper and lower locations of a rear end portion thereof, and a guide aperture formed on a vertical middle location, and mounted on one side portion of the air duct;
   a single horizontal wing having a front end portion of one side hinge-connected to an inside surface of a central wing connector of a plurality of wing connectors, and having a rear end portion of one side hinge-connected to the front end portion of the second link through the guide aperture;
   an upper horizontal wing and a lower horizontal wing located above and below the single horizontal wing to be spaced apart from each other, and having a front end portion of one side hinge-connected to the upper and lower wing connectors of the plurality of wing connectors, respectively; and
   a guide link having an upper end portion and a lower end portion hinge-connected to the rear end portions of one sides of the upper horizontal wing and the lower horizontal wing, respectively, and having a vertical middle portion hinge-connected to the rear end portion of one side of the single horizontal wing.

6. The motor-driven air vent device for the vehicle of claim 5, wherein one side surface of the single horizontal wing is integrally formed with a hinge fastening rod hinge-fastened to the front end portion of the second link through the guide aperture of the spacer.

7. The motor-driven air vent device for the vehicle of claim 5, wherein the rear end portions of one sides of the upper horizontal wing and the lower horizontal wing in addition to the rear end portion of one side of the single horizontal wing are formed with a hinge fastening extension end for hinge-fastening with the guide link to be extended backwards.

8. The motor-driven air vent device for the vehicle of claim 5, wherein the horizontal wing module further includes:
   an upper auxiliary wing having a hinge end, which is hinge-connected to the rear end portion of the upper horizontal wing, formed on a front end portion thereof, and having a pin, which is fastened to be transferable to an upper slot of the spacer, formed on a rear end portion thereof; and
   a lower auxiliary wing having a hinge end, which is hinge-connected to the rear end portion of the lower horizontal wing, formed on a front end portion thereof, and having a pin, which is fastened to be transferable to a lower slot of the spacer, formed on a rear end portion thereof.

9. The motor-driven air vent device for the vehicle of claim 5, wherein the upper horizontal wing and the lower horizontal wing are covered by a garnish mounted on a crash pad or an air duct to expose only the single horizontal wing to the interior thereof.

10. The motor-driven air vent device for the vehicle of claim 1, wherein the control module includes:
    an airflow adjustment switch module mounted on a crash pad or a steering wheel of the front of a driver seat; and
    a controller configured to receive an operation signal of the airflow adjustment switch module to apply a forward or reverse drive signal to the motor.

11. The motor-driven air vent device for the vehicle of claim 10, wherein the airflow adjustment switch module includes an upward touch switch, a downward touch switch, and an auto-operational touch switch in a predetermined arrangement and is adopted as a touch sensor module on which a touch sensor is located on the bottom of each touch switch.

* * * * *